(12) United States Patent
Alfier et al.

(10) Patent No.: US 12,163,656 B2
(45) Date of Patent: Dec. 10, 2024

(54) LIGHT FIXTURE FOR GENERATING HIGH-VISIBILITY LIGHT BEAMS AT LONG DISTANCES

(71) Applicant: CLAY PAKY S.R.L., Seriate (IT)

(72) Inventors: Alberto Alfier, Vedelago (IT); Aris Quadri, Seriate (IT); Renato Frison, Chions (IT)

(73) Assignee: CLAY PAKY S.R.L., Seriate (IT)

( * ) Notice: Subject to any disclaimer, the term of this patent is extended or adjusted under 35 U.S.C. 154(b) by 0 days.

(21) Appl. No.: 18/507,507

(22) Filed: Nov. 13, 2023

(65) Prior Publication Data

US 2024/0167666 A1 May 23, 2024

(30) Foreign Application Priority Data

Nov. 18, 2022 (IT) .......................... 102022000023865

(51) Int. Cl.
*F21V 5/04* (2006.01)
*F21V 21/30* (2006.01)
(Continued)

(52) U.S. Cl.
CPC .............. *F21V 5/045* (2013.01); *F21V 21/30* (2013.01); *F21W 2131/107* (2013.01); *F21Y 2115/10* (2016.08)

(58) Field of Classification Search
CPC .......... F21V 5/045; F21V 21/30; F21V 5/008; F21V 14/06; F21W 2131/107;
(Continued)

(56) References Cited

U.S. PATENT DOCUMENTS 9,328,898 B1  5/2016 Flasck
10,234,105 B2 *  3/2019 Jurik ....................... F21V 5/045
(Continued)

FOREIGN PATENT DOCUMENTS

CA              2885241 A1 *  3/2014  ............... F21K 9/62
IT        201800005392        11/2019
WO    WO-2013003569 A2 *  1/2013  ............. G02B 21/06

OTHER PUBLICATIONS

Alfier, IT201800005392A1, Nov. 15, 2019, Projector (Year: 2019).*
(Continued)

*Primary Examiner* — Zheng Song
*Assistant Examiner* — Glenn Zimmerman
(74) *Attorney, Agent, or Firm* — Leason Ellis LLP

(57) ABSTRACT

A light fixture includes a source assembly comprising at least one solid state light source and configured to generate a light beam in an emission direction; and at least one outlet optical assembly arranged so as to intercept the light beam emitted by the source assembly. The outlet optical assembly comprises at least one outlet lens, which is arranged so as to be the last lens that intercepts the light beam, at least partially. The outlet lens is sized so that the optical efficiency of the light fixture is at least equal to 90%; wherein optical efficiency is the ratio between the etendue of the beam being emitted from the outlet lens and the etendue of the source assembly in accordance with the following relation:

OPTICAL EFFICIENCY=$Etendue_{OUT}$/$Etendue_{SOURCE}$·100.

13 Claims, 1 Drawing Sheet

(51) Int. Cl.
*F21W 131/107* (2006.01)
*F21Y 115/10* (2016.01)

(58) Field of Classification Search
CPC .......... F21W 2131/406; F21Y 2115/10; G02B 19/0061; G02B 19/0014
See application file for complete search history.

(56) References Cited

U.S. PATENT DOCUMENTS

| | | | | |
|---|---|---|---|---|
| 2002/0163737 | A1* | 11/2002 | Kohler | G03F 7/70891 |
| | | | | 359/708 |
| 2007/0097696 | A1* | 5/2007 | Eng | F21K 9/68 |
| | | | | 257/E33.072 |
| 2007/0115655 | A1* | 5/2007 | Kaminski | F21V 7/04 |
| | | | | 362/227 |
| 2008/0158876 | A1* | 7/2008 | Thrailkill | F21V 29/767 |
| | | | | 29/726 |
| 2011/0170289 | A1* | 7/2011 | Allen | F21K 9/60 |
| | | | | 362/310 |
| 2012/0155102 | A1 | 6/2012 | Melzner et al. | |
| 2017/0068098 | A1* | 3/2017 | Chern | G01B 11/2513 |
| 2018/0209616 | A1* | 7/2018 | Lee | H01L 33/62 |

OTHER PUBLICATIONS

Wikipedia The Free Encyclopedia, (https://en.wikipedia.org/wiki/Etendue), Entendue, Mar. 1, 2024 (Year: 2024).*
Italian Search Report and Written Opinion in IT Application No. 202200023865, mailed Jun. 7, 2023 (6 pages)m an English translation is attached.
European Extended Search Report in EP Application No. 23210600.5-1020, mailed Jan. 3, 2024 (7 pages).

* cited by examiner

LIGHT FIXTURE FOR GENERATING HIGH-VISIBILITY LIGHT BEAMS AT LONG DISTANCES

CROSS-REFERENCE TO RELATED APPLICATIONS

This patent application claims priority from Italian patent application no. 102022000023865 filed on Nov. 18, 2022, the entire disclosure of which is incorporated herein by reference.

TECHNICAL FIELD

The present invention relates to a luminous light fixture. In particular, the present invention relates to a light fixture configured to generate a light beam which is clearly visible at great distance, greater than at least 50 meters.

Light fixtures of this type are normally used for architectural lighting or for the generation of signalling light beams visible from a long distance.

For example, light fixtures of this type are used for lighting skyscrapers or monuments.

STATE OF THE ART

Normally, light fixtures of this type comprise a movable casing, inside which a high-power lamp is arranged associated with a high-efficiency reflector.

The lamps normally used in the reflectors of this type have a consumption that is between 5000 and 7000 watts. For example, the most used lamps in this type of reflectors are the XENON gas arc lamps. Such lamps are capable of producing a very intense light which is clearly visible also at great distance.

However, the need to contain energy consumption is in contrast with the high consumption values of the lamps of this type.

DESCRIPTION OF THE INVENTION

An object of the present invention is thus to provide a light fixture which is devoid of the prior art drawbacks highlighted herein; in particular, an object of the invention is to provide a light fixture capable of generating light beams visible at long distance and which allows overcoming the above-highlighted drawbacks in a simple and cost-effective manner, both from the functional point of view, and from the constructive point of view.

In accordance with such purposes, the present invention relates to a light fixture comprising:
a source assembly comprising at least one solid state light source and configured to generate a light beam in an emission direction;
at least one outlet optical assembly arranged so as to intercept the light beam emitted by the source assembly; the outlet optical assembly comprising at least one outlet lens, which is arranged so as to be the last lens that intercepts the light beam, at least partially; the outlet lens being sized so that the optical efficiency of the light fixture is at least equal to 90%; wherein optical efficiency is the ratio between the etendue ($\text{Etendue}_{OUT}$) of the beam being emitted from the outlet lens and the etendue ($\text{Etendue}_{SOURCE}$) in accordance with the following relation:

$$\text{OPTICAL EFFICIENCY} = \text{Etendue}_{OUT} / \text{Etendue}_{SOURCE} \cdot 100$$

LIST OF THE FIGURES

Further characteristics and advantages of the present invention will be clear from the following description of a non-limiting example embodiment thereof, with reference to the figures of the accompanying drawings, wherein.

DESCRIPTION OF AN EMBODIMENT OF THE INVENTION

Figure 1:
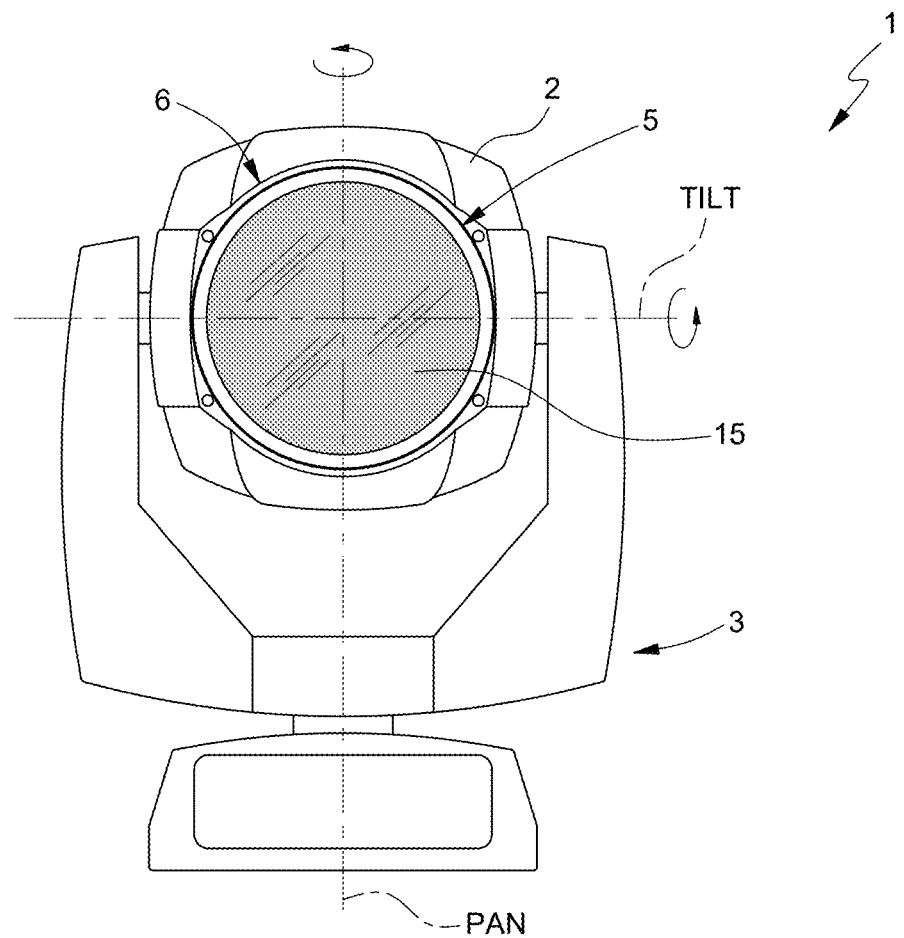
FIG. 1 is a schematic perspective view, with parts removed for clarity, of a light fixture according to the present invention.

In FIG. 1, reference numeral 1 indicates a light fixture according to the present invention. The light fixture 1 comprises a casing 2 and supporting means 3 configured to support the casing 2.

The supporting means 3 are preferably configured to move the casing 2 and to allow the casing 2 to rotate around two orthogonal axes, commonly called PAN and TILT. The operation of the supporting means 3 is adjusted by a movement control device (not visible in the accompanying figures). The movement control device can be managed also remotely, preferably by means of DMX communication protocol.

In accordance with a variation, the supporting means 3 can be configured to support only the casing 2 without allowing the movement thereof.

Figure 2:
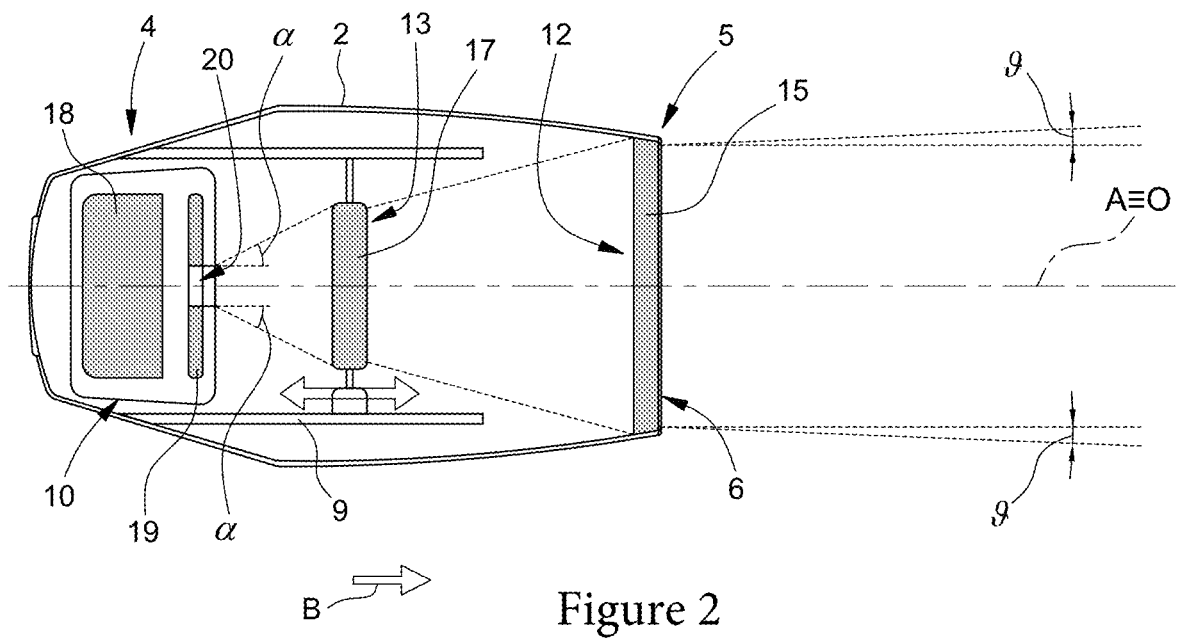
FIG. 2 is a schematic section view, with parts removed for clarity, of a detail of the light fixture of FIG. 1.

With reference to FIG. 2, the casing 2 extends along a longitudinal axis A and is provided with a first closed end 4 and a second end 5, opposite the first closed end 4 along the axis A, and provided with a projection aperture 6. In the non-limiting example described and illustrated herein, the projection aperture 6 has a substantially circular section. Preferably, the projection aperture 6 is centred on the axis A of the casing 2.

The light fixture 1 further comprises a frame 9 coupled to the casing 2 (schematically represented in FIG. 2), a source assembly 10, an outlet optical assembly 12 and at least one processing optical assembly 13.

In accordance with variations not illustrated, the light fixture 1 can comprise a colour assembly, arranged between the source assembly 10 and the processing optical assembly 13 and/or further beam processing assemblies.

The source assembly 10, the outlet optical assembly 12 and the processing optical assembly 13 are schematically represented in FIG. 2.

The frame 9 is integral with the casing 2 and comprises a plurality of elements coupled to one another and configured to define a supporting structure for the components arranged inside the casing 2, such as the source assembly 10 and the processing optical assembly 13.

The outlet optical assembly 12 is preferably directly coupled to the casing 2 at the projection aperture 6. According to a variation not illustrated, the outlet optical assembly 12 is supported by the frame 9.

The source assembly 10 is arranged inside the casing 2 at the closed end 4 of the casing 2, is supported by the frame 9, and comprises one or more light sources 18 (schematically represented as a single block in FIG. 2) adapted to emit one or more light beams mainly in an emission direction B.

By emission direction we mean the direction towards which the greater amount of light beam emitted by the light source or sources 18 of the source assembly 10 propagates.

If the source assembly 10 comprises more light sources 18, the emission direction B is determined considering the main axis of the sum of the light beams emitted by the light sources 18 which, as it will be specifically evident in the following, will be processed so as to generate one single light beam along an optical axis O.

The light sources 18 are solid state light sources (SSL).

In the non-limiting example described and illustrated herein, the source assembly 10 comprises a plurality of laser light sources 18.

For example, the source assembly 10 can be of LARP (laser activated remote phosphor) type. For example, the light sources 18 can comprise one or more laser diodes which emit light in the blue wavelength and the light beams thereof are addressed onto a surface made of yellow phosphor, which, in turn, excited by the incident radiation, emits a white light. Alternatively, the source assembly 10 can also comprise laser diodes of different colour (Red, Green or Blue).

Preferably, the light sources 18 are contained inside optical devices (commonly called Light Engines) necessary for optically integrating the single sources and generating at the outlet a light beam which is spatially homogeneous and uniformly distributed.

Inside such Light Engines, the light sources 18 are preferably arranged on a same plane and are substantially organized as a matrix. In other words, the light sources 18 are arranged along horizontal rows and vertical columns.

Preferably, the matrix of light sources 18 is centred on the longitudinal axis A of the casing 2.

The source assembly 10 further comprises a shaping plate 19 for shaping the outgoing beam, said shaping plate 19 being provided with an aperture 20, preferably circular and having radius $R_S$.

The shaping plate 19 is arranged downstream of the light sources 18 in the emission direction B.

Substantially, the source assembly 10 generates a light beam having an emission area $A_S$ defined by the passage section of the aperture 20. The beam emitted by the source assembly 10 further has an aperture angle α.

A variation not illustrated provides for the light sources to be white LEDs or of different colour (for example, RGB).

Besides the light sources 18, the source assembly 10 can comprise a plurality of lens and optical elements associated with respective light sources.

The source assembly 10 as defined above is configured and sized so as to have an Etendue$_{SOURCE}$ value greater than a given threshold.

In the non-limiting example described and illustrated herein, the Etendue$_{SOURCE}$ value of the source assembly 10 is determined by the physical dimensions (diameter and angular distribution) of the beam emitted by the source assembly 10.

Specifically, by Etendue we mean a property of the light in an optical system, defined as the product of the area of the source multiplied by the solid angle in which the light is emitted; the Etendue is a parameter numerically expressed by the following relation and indicative of the degree of widening of the beam in terms of circular area and solid angle:

$$\text{Etendue}_{SOURCE} = \pi A_S [\sin(\alpha/2)]^2 = [\pi R_S \sin(\alpha/2)]^2$$

Where:

$A_S$ is the emission area of the source assembly 10 equal to the passage section of the aperture 20 of the shaping plate 19;

$R_S$ is the radius of the aperture 20 of the shaping plate 19;

α is the aperture angle that delimits the solid angle of the light emitted by the source assembly 10 at the aperture 20 of the shaping plate 19.

Practically, the optical parameter Etendue$_{SOURCE}$ provides an indication of the extension (in terms of area and angle) of the beam emitted by the source assembly 10.

The outlet optical assembly 12 is arranged so as to intercept the light beam emitted by the source assembly 10 and comprises an outlet lens 15, which is arranged so as to be the last lens that intercepts the light beam emitted by the source assembly 10, at least partially.

In the non-limiting example described and illustrated herein, the outlet optical assembly 12 comprises the sole outlet lens 15. It is understood that the outlet optical assembly can also comprise other optical elements.

The outlet optical assembly 12 is sized so as to maximize the efficiency of the light fixture 1 and obtain as much as possible a light tube with a very low outlet angle of the beam from the light fixture 1, preferably close to zero.

In particular, the outlet optical assembly 12 is sized so as to have an optical efficiency at least equal to 90%, preferably equal to 100%.

The optical efficiency is defined as the ratio between the Etendue$_{OUT}$ of the beam being emitted from the light fixture 1 and the Etendue$_{SOURCE}$ in accordance with the following relation:

OPTICAL EFFICIENCY=Etendue$_{OUT}$/Etendue$_{SOURCE}$·100

Therefore, in order to have 100% efficiency, the Etendue$_{OUT}$ of the beam being emitted from the outlet lens 15 shall not be lower than the Etendue$_{SOURCE}$.

Considering the following relation:

$$\text{Etendue}_{OUT} = \pi A_{out} [\sin(\theta/2)]^2 = [\pi R_{out} \sin(\theta/2)]^2$$

and considering the projection needs of a beam being emitted from the light fixture 1 having a very contained outlet angle θ (<1° and preferably less than 0.5), the diameter $D_{OUT}$ of the outlet lens 15 will have to be equal to at least 280 mm, preferably 300 mm.

Thanks to the above-described sizing, the light fixture 1 according to the present invention is capable of generating a light beam having intensity and luminance greater than any light fixture commercialized up to now and with a consumption definitely contained and less than 0.30 kwatts.

Thanks to the above-described high optical efficiency, the light beam emitted by the source assembly 10 is substantially projected without losses.

In fact, the light fixture 1 is capable of projecting a very intense light beam, with a very contained outlet angle visible from very far.

Preferably, the outlet lens 15 is a plano-convex or biconvex lens made of plastic (for example, PC or PMMA) or glass (for example, of Borofloat type).

Preferably, the outlet lens 15 is fixed. In this manner, the distance between the shaping plate 19 and the outlet lens 15 is fixed and guarantees the required efficiency.

In a possible derivation, the outlet lens 15 may be of Fresnel type (made of plastic or glass).

The processing optical assembly 13 is arranged inside the casing 2 between the source assembly 10 and the outlet optical assembly 12 and is preferably configured to focus the incident beam on the outlet lens 15 and to possibly adjust the emission angle 9 of the light beam being emitted from the light fixture 1.

The processing optical assembly 13 comprises at least one focus lens 17 movable between several positions along the axis.

It is understood that the processing optical assembly 13 can also comprise more than one lens, coupled so as to obtain the desired focus effect.

Preferably, the processing optical assembly 13 is movable along the axis A for adjusting the focus of the projected image. In particular, the processing optical assembly 13 is movable along the axis A between a first operating position and a second operating position so as to allow modifying the emission angle θ of the beam being emitted from the light fixture 1 (from a minimum value—for example, 0.57°-to a maximum value—for example 10°).

Preferably, the processing optical assembly 13 is coupled to a trolley movable on the frame 9 along the axis A (not illustrated for simplicity).

The position of the focus lens 17 is adjusted by a control device of the beam processing means (not visible in the accompanying figures). The control device of the beam processing elements can be managed also remotely, preferably by means of DMX communication protocol.

The sizing of the outlet lens 15 obtained by means of the indicated relations, imposes non-negligible axial dimensions of the casing 2. In particular, the casing 2 has an axial length greater than 500 mm.

Finally, it is evident that modifications and variations can be made to the light fixture described herein without departing from the scope of the appended claims.

The invention claimed is:

1. A light fixture comprising:
a source assembly comprising a plurality of laser light sources and configured to generate a light beam in an emission direction;
at least one outlet optical assembly arranged so as to intercept the light beam emitted by the source assembly; the outlet optical assembly comprising at least one outlet lens, which is arranged so as to be the last lens that intercepts the light beam, at least partially; the outlet lens being sized so that the optical efficiency of the light fixture is at least equal to 90%; wherein optical efficiency is the ratio between the etendue of the beam being emitted from the outlet lens and the etendue of the source assembly in accordance with the following relation:

OPTICAL EFFICIENCY=Etendue$_{OUT}$/Etendue$_{SOURCE}$·100;

wherein the source assembly comprises a planar shaping plate for shaping the outgoing beam, said shaping plate being provided with an aperture; the shaping plate being arranged downstream of the at least one light source in the emission direction; the Etendue of the source assembly being defined by the following relation:

Etendue$_{SOURCE}$=π$A_S$[sin(α/2)]^2=[π$R_S$ sin(α/2)]^2 where
$A_S$ is the emission area of the source assembly and is equal to the passage section of the aperture of the shaping plate;
$R_S$ is the radius of the aperture of the shaping plate; and
α is the aperture angle that delimits the solid angle of the light emitted by the source assembly at the aperture of the shaping plate.

2. The light fixture according to claim 1, wherein the outlet lens is sized so that the emission angle of the light beam being emitted from the outlet lens is below 1°.

3. The light fixture according to claim 1, wherein the outlet lens has a diameter greater than 280 mm.

4. The light fixture according to claim 1, wherein the outlet lens is a fixed lens.

5. The light fixture according to claim 1, wherein the outlet lens is a plano-convex or biconvex lens.

6. The light fixture according to claim 1, wherein the outlet lens is a Fresnel lens.

7. The light fixture according to claim 1, wherein the outlet lens is made of plastic or glass.

8. The light fixture according to claim 1, comprising a casing provided with a projection aperture; the source assembly being housed in the casing and the outlet optical assembly being arranged at the projection aperture.

9. The light fixture according to claim 8, comprising a processing optical assembly arranged between the source assembly and the outlet optical assembly inside the casing.

10. The light fixture according to claim 8, wherein the casing is movable.

11. The light fixture according to claim 8, wherein the casing extends along a longitudinal axis; the casing having an axial length greater than 500 mm.

12. A light fixture comprising:
a source assembly comprising a plurality of laser light sources and configured to generate a light beam in an emission direction;
at least one outlet optical assembly arranged so as to intercept the light beam emitted by the source assembly; the outlet optical assembly comprising at least one outlet lens, which is arranged so as to be the last lens that intercepts the light beam, at least partially; the outlet lens being a fixed lens and being sized so that the optical efficiency of the light fixture is at least equal to 90%; wherein optical efficiency is the ratio between the etendue of the beam being emitted from the outlet lens and the etendue of the source assembly in accordance with the following relation:

OPTICAL EFFICIENCY=Etendue$_{OUT}$/Etendue$_{SOURCE}$·100;

a processing optical assembly, which is arranged between the source assembly and the outlet optical assembly inside a casing and is configured to focus the incident beam on the outlet lens and to selectively adjust the emission angle of the light beam being emitted from the light fixture;
wherein the source assembly comprises a planar shaping plate for shaping the outgoing beam, said shaping plate being provided with an aperture; the shaping plate being arranged downstream of the at least one light source in the emission direction; the Etendue of the source assembly being defined by the following relation:

Etendue$_{SOURCE}$=π$A_S$[sin(α/2)]^2=[π$R_S$ sin(α/2)]^2 where
$A_S$ is the emission area of the source assembly and is equal to the passage section of the aperture of the shaping plate;
$R_S$ is the radius of the aperture of the shaping plate;
α is the aperture angle that delimits the solid angle of the light emitted by the source assembly at the aperture of the shaping plate.

13. A light fixture comprising:
a source assembly comprising a plurality of laser light sources and configured to generate a light beam in an emission direction;
at least one outlet optical assembly arranged so as to intercept the light beam emitted by the source assembly; the outlet optical assembly comprising at least one outlet lens, which is a fixed lens and is arranged so as to be the last lens that intercepts the light beam, at least partially; the outlet lens being a fixed lens and being sized so that the optical efficiency of the light fixture is at least equal to 90%; wherein optical efficiency is the ratio between the etendue of the beam being emitted from the outlet lens and the etendue of the source assembly in accordance with the following relation:

OPTICAL EFFICIENCY=$\text{Etendue}_{OUT}/\text{Etendue}_{SOURCE} \cdot 100$;

a processing optical assembly, which is arranged between the source assembly and the outlet optical assembly inside a casing and is configured to focus the incident beam on the outlet lens and to selectively adjust the emission angle of the light beam being emitted from the light fixture;

wherein the source assembly comprises a planar shaping plate for shaping the outgoing beam, said shaping plate being provided with an aperture; the shaping plate being arranged downstream of the at least one light source in the emission direction; the Etendue of the source assembly being defined by the following relation:

$\text{Etendue}_{SOURCE} = \pi A_S [\sin(\alpha/2)]^2 = [\pi R_S \sin(\alpha/2)]^2$ where
- $A_S$ is the emission area of the source assembly and is equal to the passage section of the aperture of the shaping plate;
- $R_S$ is the radius of the aperture of the shaping plate; and
- $\alpha$ is the aperture angle that delimits the solid angle of the light emitted by the source assembly at the aperture of the shaping plate.

\* \* \* \* \*